(12) United States Patent
Li et al.

(10) Patent No.: US 7,411,955 B2
(45) Date of Patent: Aug. 12, 2008

(54) 3-LAYER VPN AND CONSTRUCTING METHOD THEREOF

(75) Inventors: Bing Li, Shenzhen (CN); Weisi Dong, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 1144 days.

(21) Appl. No.: 10/336,156

(22) Filed: Jan. 3, 2003

(65) Prior Publication Data
US 2004/0037275 A1 Feb. 26, 2004

(30) Foreign Application Priority Data
Aug. 23, 2002 (CN) .................. 02 1 29009

(51) Int. Cl.
H04L 12/56 (2006.01)
(52) U.S. Cl. ...................... 370/392; 709/238
(58) Field of Classification Search ............... 370/392, 370/397, 399, 395.32
See application file for complete search history.

(56) References Cited

U.S. PATENT DOCUMENTS

| | | | | |
|---|---|---|---|---|
| 7,075,933 B2 * | 7/2006 | Aysan | ................... | 370/395.31 |
| 7,116,665 B2 * | 10/2006 | Balay et al. | ................... | 370/392 |
| 7,152,115 B2 * | 12/2006 | Ould Brahim et al. | ...... | 709/238 |
| 7,340,519 B1 * | 3/2008 | Golan et al. | ................. | 709/225 |
| 2003/0142674 A1 * | 7/2003 | Casey | ........................ | 370/393 |
| 2003/0217132 A1 * | 11/2003 | Batten et al. | ................ | 709/223 |
| 2003/0223406 A1 * | 12/2003 | Balay et al. | .................. | 370/352 |
| 2004/0076165 A1 * | 4/2004 | Jean-Francois et al. | ..... | 370/400 |
| 2004/0223497 A1 * | 11/2004 | Sanderson et al. | ..... | 370/395.52 |
| 2005/0190757 A1 * | 9/2005 | Sajassi | ........................ | 370/389 |
| 2006/0215578 A1 * | 9/2006 | Andrapalliyal et al. | ...... | 370/254 |
| 2006/0215579 A1 * | 9/2006 | Nadeau et al. | .............. | 370/254 |
| 2006/0274723 A1 * | 12/2006 | Siyavudeen et al. | ......... | 370/352 |
| 2007/0086448 A1 * | 4/2007 | Hu | .............................. | 370/389 |
| 2007/0140251 A1 * | 6/2007 | Dong | ......................... | 370/392 |
| 2007/0226325 A1 * | 9/2007 | Bawa et al. | ................. | 709/223 |

(Continued)

FOREIGN PATENT DOCUMENTS

EP 1 187 405 3/2002

(Continued)

OTHER PUBLICATIONS

Overview of MPLS Virtual Private Networks.*

(Continued)

*Primary Examiner*—Edan Orgad
*Assistant Examiner*—Salman Ahmed
(74) *Attorney, Agent, or Firm*—DLA Piper US LLP

(57) ABSTRACT

A 3-layer Virtual Private Network (VPN) is disclosed and includes P devices and PE devices in the backbone network, a plurality of sites and CE devices in subscribers' VPNs, and Hierarchy of PE (HoPE) devices, the HoPE devices serve as edge routers in the backbone network and are connected to P devices in the backbone network as well as sites and CE devices in subscribers' VPNs; the HoPE devices include understratum PEs (UPEs), zero or more middle-level PEs (MPEs) and superior PEs (SPEs) connected with each other, and all of the PEs (UPEs, MPEs, and SPEs) take different roles and deliver the function of a central PE. For the SPEs, the routing and forwarding performance should be relatively higher; while for UPEs, the performance may be lower. The architecture can enhance the expandability in hierarchical BGP/MPLS VPNs.

8 Claims, 3 Drawing Sheets

U.S. PATENT DOCUMENTS

2008/0089334 A1* 4/2008 Soja-Molloy et al. ....... 370/392

FOREIGN PATENT DOCUMENTS

| EP | 1392033 | * | 2/2004 |
| EP | 1713197 | * | 10/2006 |
| EP | 1768335 | * | 3/2007 |

OTHER PUBLICATIONS

Quantitative analysis of multiprotocol label switching (MPLS) in VPNs; Khan, M.A. Sir Syed University of Engineering and Technology; This paper appears in: Students Conference, ISCON '02. Proceedings. IEEE Publication Date: Aug. 16-17, 2002 vol. 1, On pp. 56-65 vol. 1.*

Overview on MPLS Virtual Private Networks; Journal Photonic Network Communications Publisher Springer Netherlands ☐☐ISSN 1387-974X (Print) 1572-8188 (Online) Issue vol. 4, No. 2 / May 2002 ☐☐.*

R. Callon et al., "A Framework for Provider Provisioned Virtual Private Networks", printout from Internet <URL:www.ietf.org>, retrieved on May 27, 2003, draft dated Jul. 19, 2001, 72 Pages.

Eric C. Rosen, "BGP/MPLS VPNs", printout from Internet <URL:www.ietf.org>, retrieved on May 27, 2003, draft dated Jul. 2002, 41 Pages.

Bin Li et al., "Hiearchy of Provider Edge Device in BGP/MPLS VPN", printout from Internet <URL:www.ietf.org>, retrieved on May 27, 2003, draft dated Nov. 6, 2002, 12 pages.

M. Lasserre et al., "Virtual Private LAN Services over MPLS", Internet Draft, Jun. 2002, printout from Internet(URL:www.ietf.org).

* cited by examiner

3-LAYER VPN AND CONSTRUCTING METHOD THEREOF

BACKGROUND OF THE INVENTION

1. Technical Field of the Invention

The present invention relates to the architecture of a 3-layer Provider Provide VPN (PP VPN) and constructing method thereof.

2. Background

There are different implementations of traditional PP VPN architecture in actual applications, such as BGP/MPLS VPN, VR VPN, and MPLS 12 VPN, etc. As for BGP/MPLS VPN (Multi Protocol Label Switch based on Switch Border Gateway Protocol), the PP VPN is a network that delivers IP VPN service in public networks with MPLS technology and BGP. The BGP/MPLS VPN architecture mainly comprises a backbone network composed of P devices and PE devices provided by ISP as well as subscribers' VPN that comprises a plurality of sites and CE devices.

In said devices, P (Provider Router) devices are mainly responsible for forwarding MPLS. PE (Provider Edge Router) devices are the main body to realize MPLS/BGP VPN service, and they maintain independent lists of sites in subscribers' VPNs, and detect VPN topologies and learn internal VPN routes through BGP. CE (Custom Edge Router) devices are common routers, and they connect sites in subscribers' VPNs to PEs, without supporting any MPLS or VPN signaling or protocol.

In the BGP/MPLS VPN architecture, PE devices may be the bottleneck in large-scale deployments because they have to converge routes from a plurality of VPNs (especially in cases that capacity of PE devices is small). Furthermore, most traditional MPLS VPN models are planar ones, wherever a PE device resides in the network, its performance should be the same as others. In such an environment, more routes have to be maintained as PE expands towards edge because routers converge layer by layer. For a 3-layer model typical network employing a core-convergence-access architecture, the performance of devices degrades as the network expands, which brings difficulty to the expansion of network towards the edge. To solve said problem, a Multi-VRF (VPN routing/forwarding instance) scheme is proposed to enhance the capacity of CE devices to deliver VRF functionality. Such devices are called VCE devices. In networking, a plurality of VCE devices and PE devices are combined to form a distributed PE. Seen from FIG. 1, multiple VRFs are configured in VCE, and the VRFs correspond to multiple VPN sites. On each VRF there are some downward interfaces to connect to VCE devices and an upward interface to connect to PE devices. On PE devices, the same VRFs are configured correspondingly, and each VRF has one or more interfaces, which connect with VCE devices. Thus, a Multi-VRF CE device simulates multiple CE devices actually, each virtual CE is isolated from each other to access multiple VPN subscribers, but the PE devices don't "know" whether they are connected to multi CE devices or a VCE device. Therefore, any expansion is unnecessary. Though the scheme solves the problem of expandability of PE devices to some extent, the disadvantage is also obvious, i.e.

a large amount of interfaces, sub-interfaces are needed between PE and VCE devices, which consume limited interfaces and IP addresses resource;

multiple VRFs have to be configured on PE and CE devices, which is a heavy-labor and repetitive work;

if a dynamic route protocol is used in exchange of routes between PE and VCE devices, PEs and VCEs need to run multiple instances; if static routes are used, the configuration is a heavy-labor work;

if tunnel interfaces are used to connect PEs with VCEs instead of direct connection, each VRF will need a tunnel, resulting in heavy consumption of resource;

if different VCEs are connected with each other to deliver VPN messages to reduce the burden on PE devices, each VRF needs an interface/sub-interface.

SUMMARY

We provide a 3-layer PP VPN comprising P devices and PE devices in the backbone network, sites and CE devices in the subscribers' VPNs, and HoPE devices. Said HoPE (hierarchy of PE devices) serves as an edge router in the backbone network and is connected to P devices in the backbone and sites and CE devices in VPNs;

said HoPE comprises understratum PEs (UPEs) and superior PEs (SPEs) which are connected with each other; therein the UPEs are responsible for maintaining the routes to VPN sites connected directly with them, and allocating internal labels for routes to the VPN sites, and issuing labels to SPEs through VPN routes; the SPEs are responsible for maintaining all routes in VPNs where the sites are connected via UPEs, and issuing default VRF (VPN routing/forwarding instance) routes or converged VRF routes to UPEs, and carrying labels;

said UPEs and SPEs as well as different UPEs are connected with each other via interfaces or sub-interfaces, and the messages among them are forwarded with labels.

Said HoPE also comprises some middle-level PEs (MPEs) between UPEs and SPEs;

said MPEs are responsible for maintaining all routes in VPNs where the sites are connected via UPEs, issuing default VRF (VPN routing/forwarding instance) routes or converged routes to UPEs, and replacing the labels carried by default VRF routes issued from SPEs, and issuing them to UPEs; if a MPE has generated a default route for the VRF, it will generate an ILM on MPE.

A constructing method for the 3-layer VPN comprises:

deploy HoPE devices in the backbone network, and said HoPE devices serve as edge routers in the backbone network and are connected to P devices in the backbone network and sites and CE devices in subscribers' VPNs; said HoPE comprises understratum PEs (UPEs) and superior PEs (SPEs) which are connected with each other; therein the UPEs are responsible for maintaining the routes to VPN sites connected directly with them, and allocating internal labels for routes to the VPN sites, and issuing labels to SPEs through VPN routes; the SPEs are responsible for maintaining all routes in VPNs where the sites are connected via UPEs, and issuing default VRF (VPN routing/forwarding instance) routes or converged VRF routes to UPEs, and carrying labels;

said UPEs and SPEs are connected with each other via interfaces or sub-interfaces, and the messages among them are forwarded with labels.

Said HoPE also comprises some middle-level PEs (MPEs) between UPEs and SPEs, said MPEs are responsible for maintaining all routes in VPNs where the sites are connected via UPEs, issuing default VRF (VPN routing/forwarding instance) routes or converged routes to UPEs, and replacing the labels carried by default VRF routes issued from SPEs, and issuing them to UPEs; if a MPE has generated a default route for the VRF, it will generate an ILM on MPE.

Messages can be exchanged among said SPEs, MPEs, and the UPEs which connected with each other through MP-BGP (Multi Protocol-Border Gateway Protocol).

If said SPEs, MPEs and UPEs are managed by the same operator, said MP-BGP is a MP-IBGP (Multi Protocol-Internal Border Gateway Protocol); however, if they are managed by different operators, said MP-BGP is a MP-EBGP (Multi Protocol-External Border Gateway Protocol).

In the HoPE, the SPEs generate global import route-target lists to filter routes from other PEs according to the collection of import route-target lists of all VRFs of UPEs connected to it.

Said global import route-target lists are dynamically generated according to the information exchanged between SPEs and UPEs, and the generating process includes: the UPEs issue ORFs (Outbound Route Filter) information to SPEs connected to them through route refresh information for BGP, wherein the ORFs contain expanded group lists, the content of which is the collection of import route-target lists of all VRFs of UPEs; said SPEs converge the extended group lists of UPEs connected with them to generate global lists.

In a HoPE, if a UPE is connected with a plurality of SPEs, all the SPEs will issue default VRF routes to said UPE, and the UPE will select one from them as a preferred route or select a plurality of routes to implement load sharing; when a UPE issues VPN routes to a plurality of SPEs, it issues all VPN routes to all SPEs or partial VPN routes to each SPE to implement load sharing.

In a HoPE, when connected with each other, two UPEs issue all VPN routes to the other to enable Sites communicate directly, the Sites are connected by the two UPEs.

We employ HoPE devices as edge routers in the backbone network, and compared with traditional Multi-VRF scheme, it has the following advantages:

only one interface or sub-interface is needed between a SPE and a UPE, which saves limited interfaces and IP address resource;

the VRFs that have configured on UPEs are unnecessary to be reconfigured repeatedly on SPEs, which reduces the configuration work;

because that MP-BGP is used to exchange routes and issue labels between SPEs and UPEs, only one opposite entity is needed for each UPE, which reduces the overhead on protocol and the configuration work;

SPEs and UPEs can be connected with each other through any type of interfaces or sub-interfaces, such as tunnel interfaces, to implement the deployment across the network (especially a MPLS network). That feature enhances the expandability in a hierarchical MPLS VPN;

the burden on SPEs can be reduced through direct connections (backdoor connections) among UPEs. Furthermore, only one interface/sub-interface is needed between two UPEs, which saves resource of interfaces and IP addresses;

the MPLS VPN can be deployed layer by layer. When the performance of some UPEs is not enough, one MPE or SPE can be added to make the UPEs shift downward. When the access capability of the SPE is not enough, a SPE can be added for it. Thus, the bottleneck problem resulted from PE devices can be solved.

DETAILED DESCRIPTION

Figure 1:
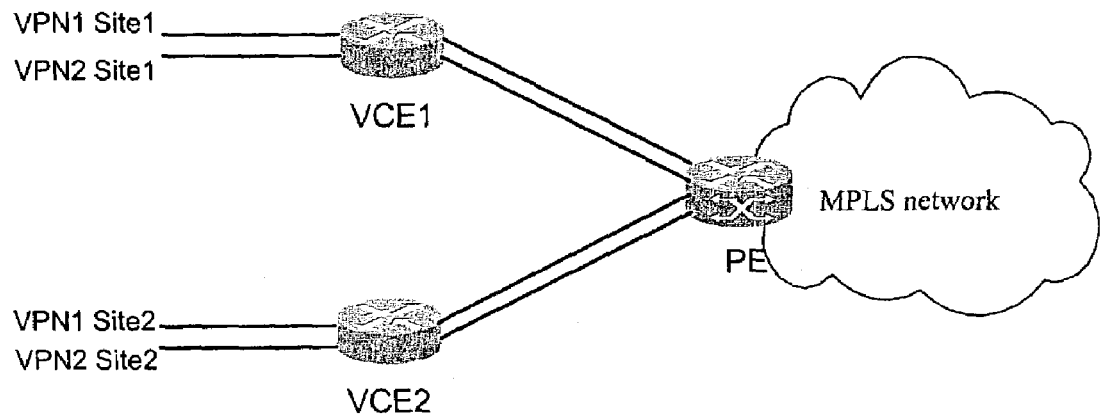
FIG. 1 is the diagram of a distributed PE application environment composed of the combination of multiple VCEs and PEs in traditional MPLS VPNs.

For example, in traditional MPLS VPN running BGP (Border Gateway Protocol), the categorization of CE and PE devices are mainly done according to the management demarcation between operators and subscribers. CE and PE devices are the borders between operators and subscribers. CE and PE devices exchange route information by using E-BGP (External Border Gateway Protocol) or IGP (Internal Gateway Protocol) route protocol, or static routes. It is not necessary for CE devices to support MPLS or "know" the VPN. PE devices exchange route information through MP-BGP (Multi Protocol-Border Gateway Protocol) between them.

In the BGP/MPLS VPN, the VPN comprises a plurality of sites, each of which corresponds to a VRF (VPN routing/forwarding instance). A VRF mainly comprises: an IP route list, a label-forwarding list, a series of interfaces using the label-forwarding list and management information (comprising RDs (Route Distinguisher), route filtering policy, and a member interface list, etc). There is no one-to-one mapping relationship between subscribers' sites and VPNs, i.e., a site may belong to multiple VPNs. In practice, each site is associated with an independent VRF. The VRF corresponding to a site in a VPN actually combines VPN membership and route policy for the site. The message forwarding information is stored in the IP route list and the label-forwarding list of each VRF. The system maintains an independent set of route list and label-forwarding list for each VRF to avoid data leakage from the VPN as well as data entering from outside of the VPN.

Suppose that VPN-IPv4 addresses are used in a VPN, the routes that the PEs received from CEs are IPv4 routes, and should be imported into the VRF route list. In that case, an additional RD should be added. In actual implementations, the same RD is set for all routes from the same site.

In the properties carried by a route, the Route Target property identifies the collection of all sites that can use the route, i.e., which sites can receive that route, and what routes from the sites can be received by the PE routers. All PE routers connected to the sites specified in the Route Target will receive the routes. When the PE routers receive the routes containing that property, they append them into corresponding route lists. A PE router has two collections containing the property: one collection is to be attached to the routes received from a site, and it is called Export Targets; the other collection is used to determine which routes can be imported into the route list of the site, and it is called Import Targets. The VPN membership can be obtained through matching the Route Target property carried by routes. Matched Route Target property can be used to filter the route information received by PE routers.

Because the PE devices have to converge routes from a plurality of VPNs, they may be the bottleneck in large-scale deployments, especially in cases that small-capacity PE devices are used. In order to solve that problem, multiple PE devices are used to form a hierarchy of PEs (HoPE), in which the PEs will take different roles and cooperate with each other to delivery the function of a central PE device. For the SPEs, the routing and forwarding performance should be relatively higher; while for UPEs, the corresponding performance may be lower. Such an architecture can enhance the expandability in hierarchical BGP/MPLS VPNs.

Our disclosures will be described in further detail according to the following drawings.

Figure 2:
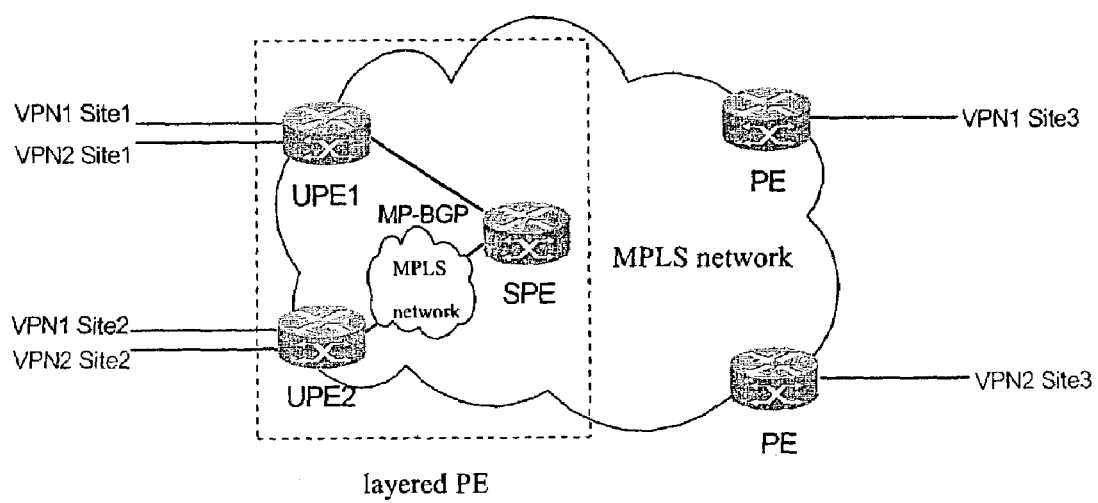
FIG. 2 is the diagram of a HoPE application environment.

The PP VPN comprises P devices and PE devices in the backbone network as well as a plurality of sites and CE devices in subscribers' VPN; the PP VPN network further comprises a hierarchy of PEs (HoPE), said HoPE serves as an edge router in the backbone network and is connected to P devices in the backbone network as well as sites and CE devices in VPN; wherein said HoPE comprises understratum PEs (UPEs) and superior PEs (SPEs) connected with each other. In the scheme, the PEs can connect not only CEs but also PEs, it is also called a MPLS VPN, as shown in FIG. 2. The connected network and the original network form a framework structure, i.e., a Hierarchy of PE (HoPE). In FIG. 2, multiple UPEs and SPEs construct a HoPE to deliver the function of a traditional PE, wherein: the UPEs are responsible for maintaining the routes to VPN sites connected directly with them, but not the routes of other remote sites in the VPN or only maintaining the converged routes thereof; SPEs are responsible for maintaining all routes connected by the UPEs (including local routes and routes in remote sites) in VPNs.

UPEs allocate internal labels for routes to sites directly connected to the UPEs, and they issue said labels to SPEs through VPN routes; SPEs don't issue routes from remote sites to UPEs, instead, and only issue default VRF routes or converged routes to UPEs, and carries labels.

MP-EBGP or MP-IBGP can be used between UPEs and SPEs. When MP-IBGP is used, SPEs serve as route reflectors (RR) for UPEs, and UPEs serve as RR clients. However, SPEs don't serve as RRs for other PEs. When MP-EBGP is used, usually UPEs use private autonomous system numbers.

The routes are forwarded with labels between UPEs and SPEs. Therefore, only one interface or sub-interface is needed. The interface or sub-interface can be a physical interface or sub-interface (such as VLAN, PVC (permanent virtual channel)), or a tunnel interface (such as GRE (general route encapsulation protocol) or LSP (labels-switching path)). When a tunnel interface is used, an IP network or MPLS network may exist between SPEs and UPEs.

Viewed from outside, HoPE is identical to a traditional PE. Therefore, they can coexist with other PEs in a MPLS network. A HoPE may serve as a UPE or SPE to construct a larger HoPE with another PE without limitation.

Figure 3:
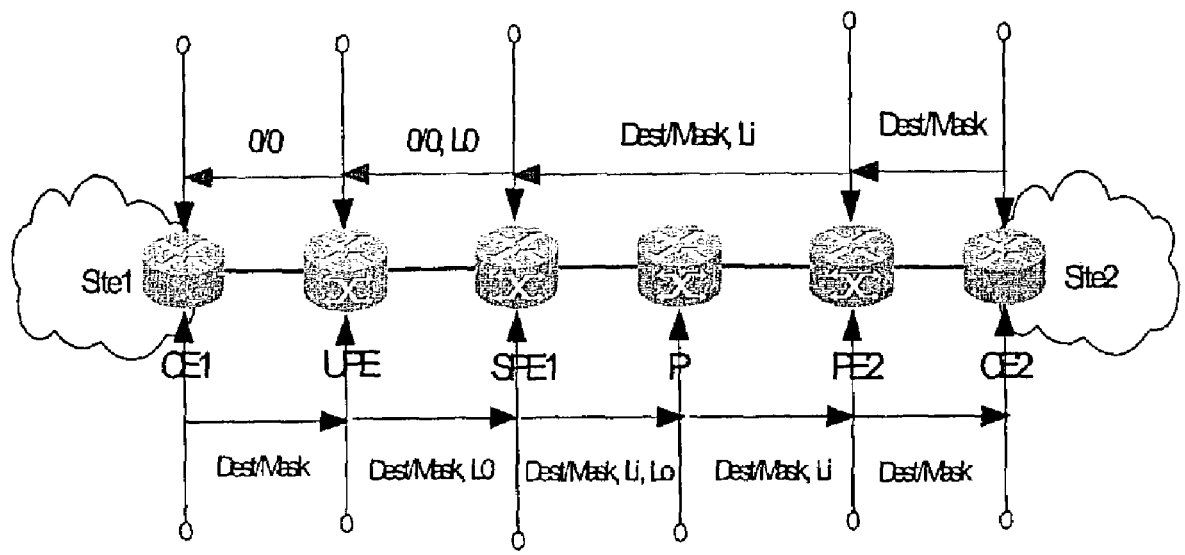
FIG. 3 illustrates the data stream and control stream from Site 1 (connected to PEs) to a remote Site 2.

FIG. 3 illustrates the data stream and control stream from Site1 (connected to PEs) to a remote Site2. In FIG. 3, suppose that there is a route Dest/Mask in Site2, CE2 issues it to PE2 through static route, IGP, BGP; then PE2 allocates it with an internal label, and forwards it to SPE1 through MP-IBGP. There is a VRF route list VRF1 on SPE1, corresponding to Site1. VRF1 contains the routes of all sites belonging to the same VPN where Site1 resides. (In this case, VRF1 contains routes of Site2.) In order to reduce the routes on UPEs, SPE1 converges the routes of VRF1. (As an exception, SPE1 converges the routes as a default route, which belongs to VRF1 and is called a default VRF route, however.) SPE1 generates a default route for each VRF and allocate different internal labels for them. Then, SPE1 sends the default routes to UPEs through MP-BGP. UPEs and CE1 exchange IPv4 routes through static routes, IGP, BGP. In the simplest case, CE1 accesses UPEs through the default routes.

When a message arrives at a UPE, the UPE searches for the default VRF route according to the VRF for CE1, pushes the internal label, and forwards the message to SPE1. SPE1 pops the label, searches in the VRF route list corresponding to the label, after matching a specific route, forwards the flow according to the a common BGP/MPLS VPN, push the internal/external labels and forwards them.

Figure 4:
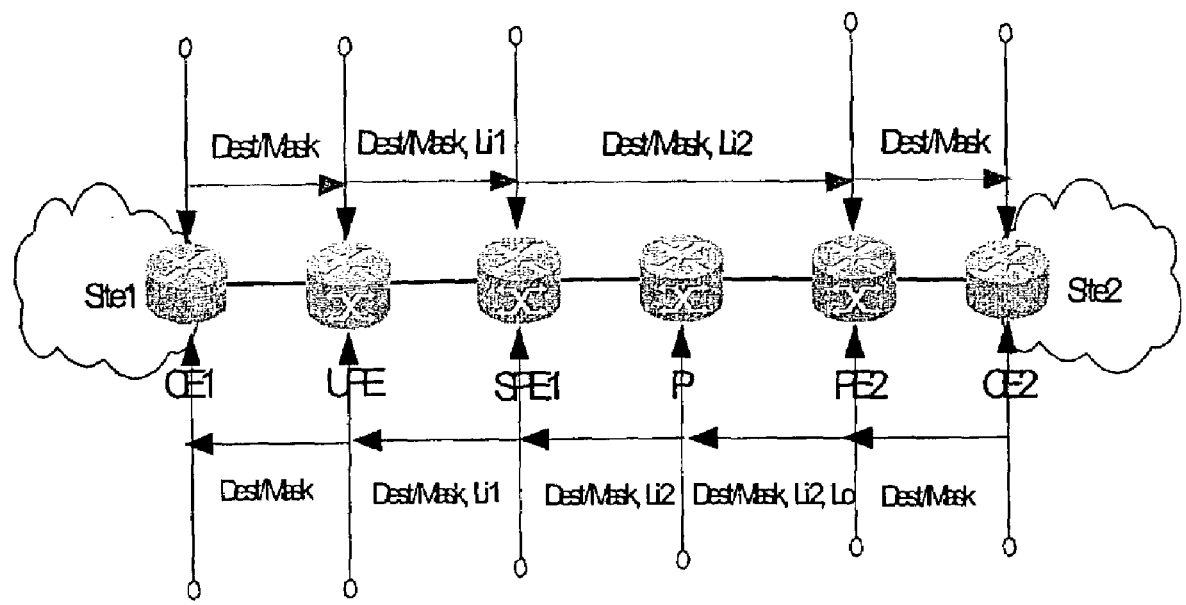
FIG. 4 illustrates the data stream and control stream from Site 2 to Site 1 in FIG. 3.

FIG. 4 illustrates the data stream and control stream from Site 2 to Site 1 in FIG. 3.

The destination address Dest/Mask in Site1 is issued to a UPE through a static route, IGP, BGP. The UPE allocates an internal label for it, and issues the label as a VPN route to SPE1 through MP-BGP. SPE1 replaces the label because the label is valid in local area, and then issues the VPN route (with a new label) to PE2 through MP-IBGP. And PE2 restores the route as an IPv4 route and issues the IPv4 route to CE2.

In message forwarding, PE2 pushes the internal/external labels for the message from CE2, and forwards the message to SPE1 through the MPLS network. SPE1 performs a SWAP operation for the message instead of popping the internal label. Then it forwards the message (with a label) to a UPE. The label is allocated by the UPE for the route. Then the UPE pops the internal label, and forwards it to CE1.

By comparison, the route exchange and data forwarding between UPEs and SPEs are asymmetrical. All VPN routes of UPEs should be issued to SPEs; while SPEs only issue converged VPN routes (even default VRF routes) to UPEs. For the messages sent from UPEs to SPEs, the labels should be popped, and the VRF forwarding list should be searched; however, for messages sent from SPEs to UPEs, only forwarding the label is needed.

In FIG. 2, the MP-BGP between a SPE and a UPE can be MP-IBGP or MP-EBGP, which depends on whether the SPEs and UPEs are managed by the same operator. If yes, MP-IBGP will be used, and the SPEs will serve as route reflectors for the UPEs except for other PEs. To reject the routes from other PEs, wherein the routes don't belong to the sites connected to the HoPE in VPNs, the SPEs should generate a global import route-target list to filter the routes sent from other PEs according to the collection of import route-target lists of all VRFs for UPEs. That global list can be dynamically generated according the information exchanged between SPEs and UPEs or be configured statically.

As for dynamic generation of said global list, the UPE issues an Outbound Route Filter message, ORF to the SPE through BGP Route Refresh message. The ORF contains an expanded group list, the content of which is the collection of import route-target lists of all VRFs. The SPE consolidates all extended group lists from the UPEs to form a global list. The generating rule for the static list is the same as the dynamic list.

If the SPEs and UPEs belong to different operators, MP-EBGP will be run between them. A global import route-target list should also be generated on SPEs. Usually the UPEs will use private autonomous system numbers, and the system numbers should be omitted when the SPE issues routes to other PEs.

It is permitted that the SPEs are connected to some UPEs through MP-IBGP and to other UPEs through MP-EBGP.

The default VRF routes sent from the SPEs to UPEs can be generated dynamically or be configured statically. For VRFs corresponding to all sites connected to the HoPE, default VRF routes should be dynamically generated and issued to all UPEs. During issuing, filtering maybe done according to said ORF.

SPEs and UPEs can be connected with each other through any type of interfaces or sub-interfaces, or through tunnel interfaces. If the connections are implemented through tunnel interfaces, an IP network or MPLS network may lies between SPEs and UPEs. In this case, because the SPEs and UPEs are quits through MP-BGP, the routes can be directly transferred between SPEs and UPEs without any special treatment. In forwarding, the messages (with labels) issued from UPEs or SPEs are transferred through a tunnel. If the tunnel is a GRE tunnel, it should support the encapsulation for MPLS messages; if the tunnel is a LSP, the intermediate network should be a MPLS network, and some protocols such as LDP/RSVP-TE should be run on UPEs and SPEs.

In the network, said HoPE devices further comprises a plurality of middle-level PEs (MPEs) between UPEs and SPEs, that is to say, a HoPE can also serve as a UPE, and it can form a new HoPE with a SPE, in the way, it can serve as a SPE, and it can form a new HoPE with a plurality of UPEs. This nest may be endless. Furthermore, a SPE is connected to a Hope to serve as a UPE while it can also be connected to individual UPEs.

Figure 5:
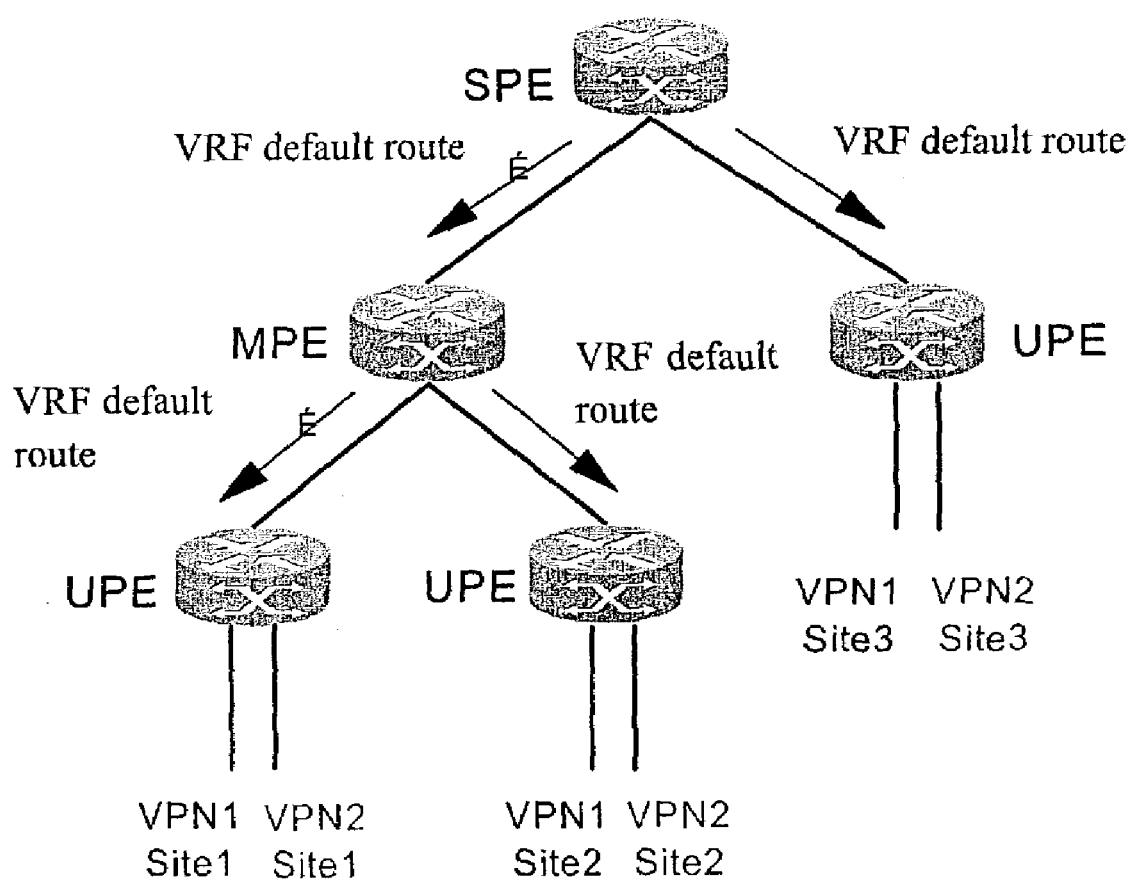
FIG. 5 is a sketch map of the 3-layer HoPE devices.

Please referring to FIG. 5, a sketch map of the 3-layer HoPE, wherein MP-BGP is run between SPEs and MPEs as well as between MPEs and UPEs. If the MP-BGP is MP-IBGP, SPEs are route reflectors for individual MPEs, and MPEs are route reflectors for individual UPEs. MP-BGP is used to issue all VPN routes on UPEs to SPEs but only issue default VRF routes or converged routes on SPEs to UPEs. Therefore, SPEs maintain the VPN routes for all sites accessed from the HoPE, the number of routers is the largest; MPEs maintain partial routes, the number of routers is larger; while UPEs only maintain VPN routes for sites directly connected to them. Such an architecture can match with the capability of devices in typical network and is high expandable.

The default VRF routes issued from SPEs carry labels, and the labels should be replaced on MPEs and then issued to UPEs. If the MPE have generated a default route for the VRF, it will generate an ILM on MPE.

Similar to the two-layer HoPE in FIG. 2, SPEs should generate global import route-target lists for UPEs to filter off unnecessary VPN routes. In detail, a MPE generates a global route-target list according to the collection of import route-target list of all VRFs on UPEs. And a SPE generates a global import route-target list according to the collection of global import route-target lists of individual MPEs. The generation may be dynamical or static. In the dynamic case, MPEs should forward the import route-target lists issued from UPEs through ORF to SPEs.

In message forwarding, when a message from a local VPN site arrives at a UPE, the UPE searches for the default route in corresponding VRF, pushes the label, and forwards the message to a MPE. The MPE pops that label, searches in the corresponding VRF route list for a default route, and then forwards the message to a SPE. The SPE pops the label, searches in the VRF list, push the internal/external labels and forwards the message according to traditional forwarding flow for a BGP/MPLS VPN.

When a message from a remote site through the MPLS network arrives at a SPE, because a MPE has allocated an internal label for the destination address, the SPE perform a SWAP operation for the internal label and forwards the message to the MPE. Similarly, because the UPE has allocated an internal label for the destination address, the MPE pops the label and forwards the message to the local site.

A UPE can be connected to a plurality of SPEs, and in this case the UPE is called a multi-return path UPE. Multiple SPEs will issue default VRF routes to the UPE, and the UPE select one of them as a preferred route or select many routes to realize load sharing. On the contrary, When the UPE issues VPN routes to a plurality of SPEs, it may issues all routes to all SPEs or issue partial VPN routes to each SPE to realize load sharing.

A backdoor connection can be established between two UPEs to enable direct communication between the sites connected to the UPEs without the help of SPEs.

The two UPEs can be connected to the same SPE or to different SPEs.

UPEs issue all their own VPN routes to the other through MP-BGP. If MP-IBGP is used, the opposite UPE should not be configured as a route reflector. In this case, the UPEs are identical to common PEs in function; so as the forwarding flow. Even a network may exist between said UPEs. The messages are encapsulated in a tunnel (such as GRE or LSP), and only one tunnel is needed.

In a special case, for example, a SPE is connected to two UPEs (UPE1 and UPE2), and the two UPEs are connected to two sites (Site1 and Site2) belonging to the same VPN, the two sites may communicate with each other through the SPE. In this case, the forwarding flow is described as the following, after a message from Site1 enters the UPE1, UPE1 forwards the message to the SPE according to the default route of VRF1. The SPE pops the label, searches in the VRF route list, pushes the internal label allocated by UPE2 for the destination address, and forwardss to UPE2, then UPE2 pops the label and forwards to Site2.

In another case, a SPE is connected to a CE and a UPE, both of which are respectively connected to two sites (CE: Site1, UPE: Site2) belonging to the same VPN. In this case, Site1 and Site2 communicate with each other through the SPE, and the forwarding flow is described as the following, when a message (without a label) from Site1 arrives at the SPE through the CE, the SPE searches in the VRF route list, pushes the label allocated by the UPE, and forwards to the UPE. The UPE pops the label and forwards to Site2. When a message from Site2 arrives at the UPE, it arrives at the SPE according to the default route. The SPE pops the label, searches in the VRF route list, and forwards the message as an IP message to the CE.

Said description is based on a BGP/MPLS VPN. There are many ways to realize a 3-layer PP VPN. For example, the tunnel protocol MPLS can be substituted with GRE, IPSec (IP secure protocol) and other similar protocols. The VPN and label distributing protocol MP-BGP can be substituted with LDP and other similar protocols. Our 3-layer VPN is suitable for said cases.

What is claimed is:

1. A 3-layer VPN, comprising a P device (Provider Router) and a PE device (Provider Edge Router) in a backbone network, several sites and CE devices in a subscribers' VPN; the VPN further comprising a hierarchy of PE device (HoPE) as an edge router in the backbone network and connected to the P device in the backbone network and the several sites and CE devices in the VPNs;

said HoPE comprising an understratum PE (UPE) and a superior PE (SPE) which are connected with each other; the UPE maintaining the routes to VPN sites connected directly thereto, and allocating internal labels for routes to the VPN sites, and issuing labels to the SPE through the VPN routes; the SPE maintaining all routes in the VPN where the sites are connected via the UPE, and issuing default VRF (VPN routing/forwarding instance) routes or converged VRF routes to UPE, with labels carried;

one interface or sub-interface connecting said UPE and said SPE or connecting different UPEs, between which the messages are forwarded by labels;

wherein said HoPE further comprises several middle-level PEs (MPEs) between the UPE and the SPE; and said MPEs maintaining all routes in the VPN where the sites are connected via the UPE, issuing default VRF (VPN routing/forwarding instance) routes or converged routes to the UPE, and replacing the labels carried by the default VRF routes issued from SPE, and issuing them to UPE; if an MPE has generated a default route for the VRF, an ILM being generated on the MPE.

2. A method for constructing a 3-layer VPN, comprising:

deploying a HoPE in a backbone network, and said HoPE, as an edge router in the backbone network, connected to a P device in the backbone network and several sites and CE devices in a subscribers' VPN; said HoPE comprising an understratum PE (UPE) and a superior PE (SPE) connected each other; wherein the UPE maintaining the routes to the VPN sites connected directly to the UPE, allocating internal labels for routes to the VPN sites, and issuing labels to SPE through VPN routes; the SPE maintaining all routes in the VPN where the sites are connected via the UPE, and issuing a default VRF (VPN routing/forwarding instance) route or converged VRF route to the UPE, with labels carried;

connecting said UPE and SPE via one interface or sub-interface, between which messages are forwarded with labels;

said HoPE further comprising several middle-level PEs (MPEs) between the UPE and SPE, said MPEs maintaining all routes in the VPN where the sites are connected via the UPE, issuing a default VRF (VPN routing/forwarding instance) route or converged route to the UPE, and replacing the labels carried by the default VRF route issued from SPE, and issuing them to the UPE; if an MPE has generated the default route for the VRF, an ILM being generated on the MPE.

3. The method of claim 2, characterized in that a MP-BGP (Multi Protocol-Border Gateway Protocol) being used to exchange messages among said SPE, MPEs, and the UPE connected with each other.

4. The method of claim 2, wherein: if a same operator manages said SPE, MPEs and UPE, said MP-BGP being a MP-IBGP (Multi Protocol-Internal Border Gateway Protocol); if different operators manage said SPE, MPEs and UPE, said MP-BGP being a MP-EBGP (Multi Protocol-External Border Gateway Protocol).

5. The method of claim 2, 3 or 4, wherein: in the HoPE, the SPE generating a global import route-target list to filter routes from other PEs connected to the SPE according to the collection of import route-target list of all VRF of the UPE.

6. The method of claim 5, comprising steps: dynamically generating said global import route-target list according to the information exchanged between the SPE and UPE, and the generating step further comprising: the UPE issuing an ORF (Outbound Route Filter) message to the SPE connected thereto through a route refresh message for the BGP, the ORF containing an expanded group list, which is the collection of the import route-target list of all VRFs of the UPE; said SPE converging the extended group list of the UPE connected to the SPE to generate a global list.

7. The method of claim 6, wherein: in the HoPE, if the UPE is connected with several SPEs, all the SPEs issuing default VRF routes to said UPE, and the UPE selecting one from them as a preferred route or select several routes to implement load sharing; when issuing VPN routes to the several SPEs, the UPE issuing all VPN routes to all SPE or part of VPN routes to each SPE for sharing load.

8. The method of claim 7, wherein: in the HoPE, when two UPEs are connected directly, one of said two UPEs issuing all its VPN routes to the other to enable sites connected by said two UPES to communicate directly.

* * * * *

UNITED STATES PATENT AND TRADEMARK OFFICE
CERTIFICATE OF CORRECTION

PATENT NO.       : 7,411,955 B2                                    Page 1 of 1
APPLICATION NO.  : 10/336156
DATED            : August 12, 2008
INVENTOR(S)      : Li et al.

It is certified that error appears in the above-identified patent and that said Letters Patent is hereby corrected as shown below:

On the Title Page:

At (75), please change "Bing" to --Bin--.

Signed and Sealed this

Thirtieth Day of December, 2008

JON W. DUDAS
*Director of the United States Patent and Trademark Office*